United States Patent [19]
Jones

[11] 3,983,462
[45] Sept. 28, 1976

[54] FIELD SHUNTING CONTROL FOR A DC SERIES MOTOR

[75] Inventor: Francis Lyle Jones, Mentor, Ohio

[73] Assignee: Towmotor Corporation, Mentor, Ohio

[22] Filed: Aug. 15, 1974

[21] Appl. No.: 497,656

[52] U.S. Cl. ............................... 318/139; 318/251; 318/359
[51] Int. Cl.² ......................................... H02P 5/06
[58] Field of Search ............ 318/139, 251, 353, 359

[56] References Cited
UNITED STATES PATENTS

| | | | |
|---|---|---|---|
| 2,911,053 | 11/1959 | Ayers et al. | 318/359 X |
| 3,360,705 | 12/1967 | Morris | 318/251 X |
| 3,384,799 | 5/1968 | Thiele | 318/251 X |
| 3,590,352 | 6/1971 | Ries | 318/251 X |
| 3,656,038 | 4/1972 | Ries et al. | 318/251 X |
| 3,716,768 | 2/1973 | Mason | 318/359 X |
| 3,818,299 | 6/1974 | Paule et al. | 318/353 |

*Primary Examiner*—Gene Z. Rubinson
*Attorney, Agent, or Firm*—Wegner, Stellman, McCord, Wiles & Wood

[57] ABSTRACT

A battery powered vehicle with a series field DC drive motor has a field shunt circuit which is completed by closing a centrifugal switch responsive to motor speed, increasing the speed of the vehicle. An enabling circuit for the field shunt is completed by a switch on the vehicle accelerator.

9 Claims, 1 Drawing Figure

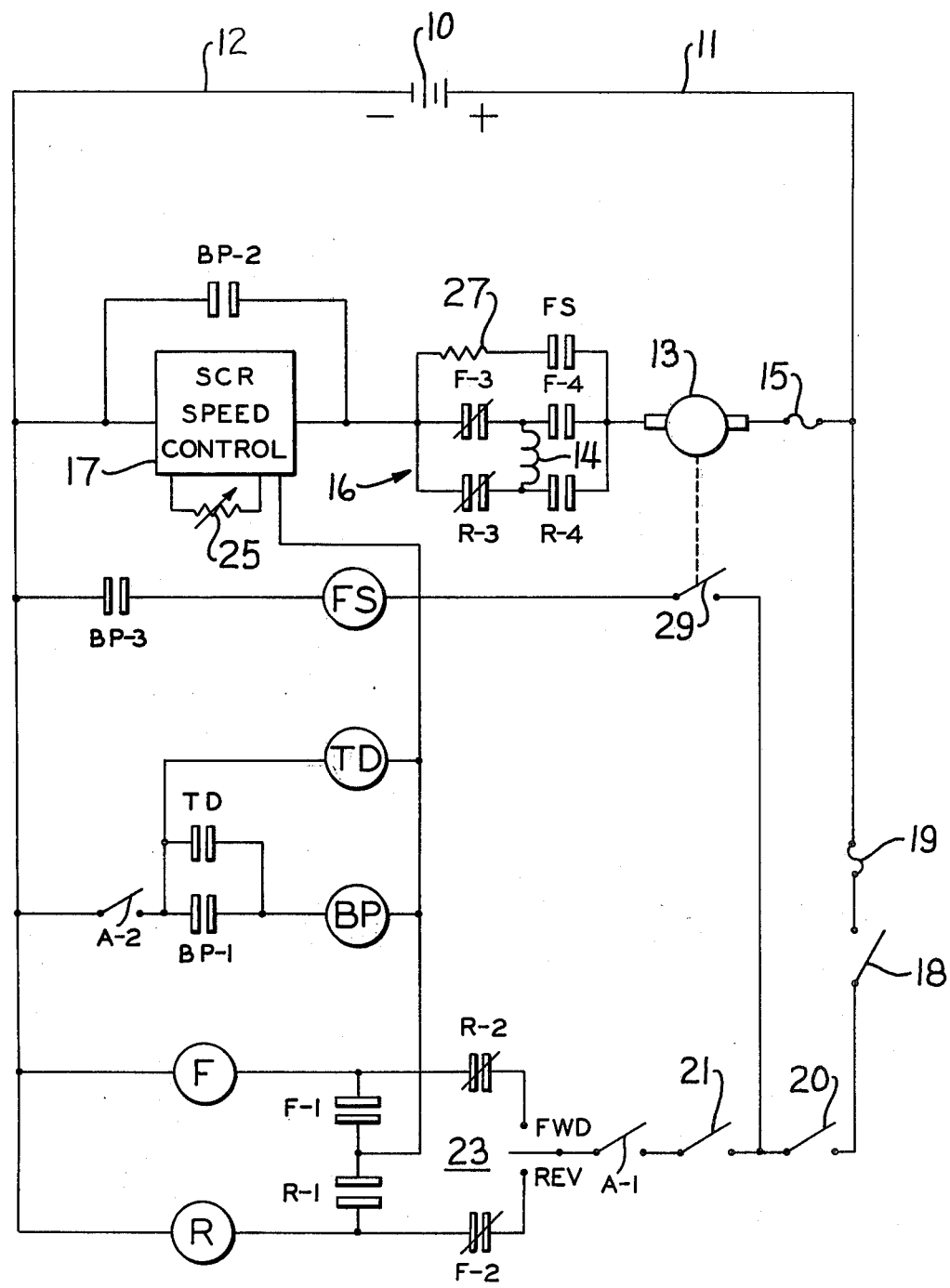

FIELD SHUNTING CONTROL FOR A DC SERIES MOTOR

This invention is concerned with a motor speed control which connects a shunt circuit in parallel with a series field of DC motor, and more particularly with such a speed control for the motor of a battery powered vehicle.

A DC motor with a series field has high starting torque characteristics and is often used in battery powered vehicles, as industrial trucks. When the motor is lightly loaded, motor speed is limited by the counter EMF developed in the armature. It is known to increase the speed by connecting a shunt circuit in parallel with the series field of the motor, reducing the field strength and thus the counter EMF of the armature. Prior field shunt controls have utilized voltage or current relations in the armature and field circuits to switch the field shunt. See for example Thiele U.S. Pat. Nos. 3,384,799 and Ries 3,656,038. These prior controls have several disadvantages. The voltage or current sensing circuits are expensive and require adjustment or calibration to control the field shunt switching at the appropriate operating points. Calibration is a time consuming and expensive procedure, adding to the cost of manufacture. The current and voltage levels in the armature and field circuits are subject to change with resistance of the armature and field windings which vary with ambient temperature and the character of the vehicle operation.

In accordance with the invention, the prior art field shunt control based on circuit condition sensing is replaced with a control responsive directly to motor speed. More particularly, a centrifugal switch is mechanically coupled to the motor armature and controls the field shunt circuit.

One feature of the invention is that the field shunt control is not temperature sensitive. The shunt circuit is switched in and out of operation at selected motor speeds, regardless of temperature.

Another feature is that the centrifugal switch does not have adjustable components available to the vehicle operator. This avoids unauthorized tampering with the field switching adjustments, frequently a problem with prior controls.

A further feature of the invention is that the centrifugal switch control is inexpensive in comparison with an electronic circuit condition sensor. Additionally, the speeds at which the switch operates are established by the design of the mechanism. The field shunt control does not require the expensive testing and calibration which is necessary with a circuit condition sensor.

Further features and advantages of the invention will readily be apparent from the following specification and from the drawing, which is a schematic diagram of a DC motor circuit for a vehicle drive, illustrating the invention.

The invention is disclosed for control of the series field shunt circuit in a DC motor driven battery powered vehicle. The control is particularly adapted for this vehicle motor circuit. It will be understood, however, that the control may be used with DC motors in other situations where a series field shunt is desired.

The circuit utilizes several relays with multiple contacts. They are illustrated in the drawing in the unenergized condition.

An industrial truck is typically powered by a 36 volt battery 10 having positive and negative terminals 11 and 12. The DC drive motor has an armature 13 and a series field winding 14, connected with the battery through fuse 15, directional circuits 16 and an SCR speed control 17.

The motor control and safety or interlock circuit includes a key switch 18 connected with the positive battery terminal 11 through fuse 19. Seat switch 20 closes when the operator sits on the vehicle seat. Brake interlock switch 21 closes when the vehicle hand brake is released. Accelerator switch A-1 closes upon initial actuation of the vehicle accelerator by the operator. A directional switch may be moved between forward (FWD) and reverse (REV) positions by the operator. The directional circuitry includes forward relay F and reverse relay R, each having four sets of contacts associated therewith.

Assuming the operator intends to proceed in a forward direction, switch 23 is moved to the FWD position. Forward relay F is energized through normally closed reverse relay contact R-2. Contact F-1 closes completing a power connection for the speed control circuitry to be described below. Contact F-2 opens preventing energization of reverse relay R.

Contacts F-3, F-4 and the corresponding contacts R-3, R-4 of the reverse relay provide directional control for the motor by determining the direction of current flow through series field winding 14. With forward relay energized, contact F-4 closes and F-3 opens. The field current flows through contacts F-4 and R-3. Similarly, with switch 23 in the REV position, reverse relay R is energized. The speed control circuit is completed through contact R-1. The connection of the field winding 14 is reversed from that of the forward connection, being completed through contacts R-4 and F-3.

SCR speed control 17 is energized when the safety interlock circuit is completed and forward or reverse direction is selected. The SCR speed control interrupts the motor current at a rate determined by the operator's actuation of the accelerator which establishes the resistance of accelerator potentiometer 25. As the operator depresses the accelerator, the duty cycle of the motor increases until current flows continuously with the accelerator fully depressed. Accelerator switch A-2 closes upon full depression of the accelerator, completing an energization circuit for time delay relay TD. After a suitable time period, as one second, contacts TD close momentarily, energizing bypass relay BP. Contacts BP-1 close completing a shunt circuit in parallel with the SCR speed control. Contacts BP-3 close completing an enabling circuit for the field shunt relay FS.

When the motor is connected directly across the battery through contact BP-2, motor speed is limited by the counter EMF developed in armature 13. The motor speed can be increased by reducing the current through series field winding 14 which reduces the field strength and the counter EMF. A field shunt circuit includes normally open contacts of a field shunt relay FS and a current limiting resistor 27. With bypass relay BP energized, contact BP-3 is closed and the field shunt relay circuit is completed when centrifugal switch 29 closes. Th centrifugal switch 29 is mechanically coupled to the armature of motor 13 to close and open at selected motor speeds. Preferably in an industrial truck, the switch closes at a speed which is typical of lightly loaded operation on a level surface and opens at a lower speed, as with the truck climbing an incline where more power is needed.

Mechanical speed sensing centrifugal switches with a wide variety of operating characteristics are available. A Daytrol switch manufactured by Hobart Manufacturing Company, which closes at 1200 RPM and opens at 950 RPM, has been found suitable for an industrial truck operation.

With the field shunt control described herein, full power is available from the motor for starting, moving heavy loads and traveling uphill. The field shunt circuit provides for high speed operation with light loads and level or downhill travel.

I claim:

1. In a vehicle powered by a battery and driven by a series DC electric motor having an armature with a series connected field winding and a circuit connected in parallel with the series field winding for shunting a portion of the armature current around the field winding to increase the maximum motor speed, said circuit having a switch therein, an improved speed control including:
   means responsive directly to the speed of said motor, closing said switch to complete the field shunt circuit above a selected motor speed.

2. The speed control of claim 1 wherein said speed responsive means closes said switch at a speed greater than a first selected speed and opens said switch at a speed less than a second selected speed which is less than said first selected speed.

3. The speed control of claim 1 wherein said vehicle has an operator actuated accelerator, means responsive to a first range of actuation of the accelerator for interrupting the circuit from the battery to the motor to control vehicle speed and means responsive to further actuation of the accelerator for bypassing said circuit interrupter means, the motor speed responsive means being disabled during speed control by said interrupter circuit and said bypass means including means for enabling said motor speed responsive means.

4. The speed control of claim 1 including a field shunt relay for actuating the normally open switch in the field shunt circuit and a circuit connecting the field shunt relay with said battery including a centrifugal switch responsive to the speed of said motor.

5. The speed control of claim 4 wherein said vehicle has an operator actuated accelerator, means responsive to a first range of actuation of the accelerator for interrupting the circuit from the battery to the motor to control vehicle speed and a bypass relay responsive to a further actuation of the accelerator for closing a contact to bypass said circuit interrupter means, the field shunt relay circuit including a contact of said bypass relay open to disable the field shunt during speed control by said interrupter circuit and closed to enable said field shunt upon said further actuation of the accelerator.

6. The speed control of claim 2 in which said motor speed responsive means includes a centrifugal switch mechanically coupled to the motor armature.

7. In a series DC electric motor having an armature with a series connected field winding, connected with a DC power source and a circuit connected in parallel with the series field winding for shunting a portion of the armature current around the field winding, said circuit having a switch therein, an improved field shunt control, including:
   means responsive directly to the speed of said motor, closing said switch to complete the field shunt circuit above a selected speed to increase the maximum motor speed.

8. The field shunt control of claim 7 in which said motor speed responsive means includes a centrifugal switch mechanically coupled to the motor armature.

9. The motor field shunt control of claim 7 including a relay for actuating the switch in the field shunt circuit and a circuit connecting the field shunt relay with said DC power source, including a centrifugal switch mechanically coupled to the motor armature and responsive to the speed thereof to actuate the relay and close the switch in the field shunt circuit.

* * * * *